United States Patent [19]
Fujimoto et al.

[11] Patent Number: 5,655,993
[45] Date of Patent: Aug. 12, 1997

[54] SHIFT CONTROL APPARATUS FOR AN AUTOMATIC TRANSMISSION

[75] Inventors: Shuichi Fujimoto, Kawagoe; Kazumi Sato, Tokorozawa; Yoshiyuki Ura, Niiza; Hisashi Kunii, Higashikurume; Takamichi Shimada, Sakado, all of Japan

[73] Assignee: Honda Giken Kogyo Kabushiki Kaisha, Tokyo, Japan

[21] Appl. No.: 630,212

[22] Filed: Apr. 10, 1996

[30] Foreign Application Priority Data

Apr. 17, 1995 [JP] Japan ................... 7-115178

[51] Int. Cl.$^6$ .................................... F16H 61/00
[52] U.S. Cl. .................. 477/116; 477/117; 475/118
[58] Field of Search .................... 477/115, 116, 477/117; 475/118, 128

[56] References Cited

U.S. PATENT DOCUMENTS

| | | | |
|---|---|---|---|
| 4,579,020 | 4/1986 | Sugano | 475/128 X |
| 4,790,418 | 12/1988 | Brown et al. | 475/128 X |
| 4,982,622 | 1/1991 | Yamamoto et al. | 477/117 |
| 5,094,128 | 3/1992 | Kamada | 477/117 |
| 5,134,903 | 8/1992 | Itoh | 477/117 X |
| 5,285,880 | 2/1994 | Minagawa et al. | 475/128 X |
| 5,288,279 | 2/1994 | Sakai et al. | 475/128 X |
| 5,329,830 | 7/1994 | Kitagawa et al. | 477/117 |
| 5,417,626 | 5/1995 | Gierer | 477/117 |
| 5,558,599 | 9/1996 | Tsukamoto et al. | 477/117 X |

FOREIGN PATENT DOCUMENTS

| 36390 | 1/1991 | Japan . |
|---|---|---|
| 6109130 | 4/1994 | Japan . |

Primary Examiner—Charles A. Marmor
Assistant Examiner—Peter T. Kwon
Attorney, Agent, or Firm—Lyon & Lyon LLP

[57] ABSTRACT

A shift control apparatus for an automatic transmission for a vehicle wherein D-N-D in-gear shifts are carried out quickly without any shift shock. Engagement-actuation control for a frictionally engaging element to establish a D range when a shift is made from a N range to the D range comprises a plurality of control stages, for example, an invalid-stroke clearing stage, an intermediate-pressure retaining stage, a feedback stage, etc. When the shift to the D range is made following a shift from the D range to the N range, a shift control apparatus detects the engagement condition of the the frictionally engaging element for establishing the D range, selects one of the control stages in correspondence with the engagement condition, and initiates the engagement-actuation control for the frictionally engaging element from the control stage selected.

14 Claims, 13 Drawing Sheets

SHIFT CONTROL APPARATUS FOR AN AUTOMATIC TRANSMISSION

FIELD OF THE INVENTION

The present invention relates generally to an automatic transmission (including a continuously variable transmission capable of preforming automatic speed change) for use in vehicles, and particularly to a shift control apparatus for controlling shift from a neutral range to a forward range. The shift control from the neutral range to the forward range or to a reverse range is referred to as "in-gear control".

BACKGROUND OF THE INVENTION

Automatic transmissions comprise a plurality of gear trains. Their speed ranges are selected among a plurality of power transmission paths which are composed of these gear trains by actuating such frictionally engaging elements as clutches and brakes through the supply of hydraulic pressure. When a speed range shift is made, the power transmission paths switch to change the transmission gear ratio. If a shift is carried out suddenly, there arises a problem of shift shock. Therefore, various ideas have been contrived to adjust engagement of the frictionally engaging elements in order to carry out speed-range shifts smoothly without any shock.

This shift shock problem is especially noticeable if the shift lever is operated from the neutral range to the forward range (which is referred to as "in-gear shift"). The reason is that there is a little input torque but a large ratio of transmission torque change to engaging capacity change in the frictionally engaging element involved in the in-gear control, through which the transmission shifts from the neutral range having no load to the forward (or reverse) range: Therefore, this frictionally engaging element requires delicate engagement-actuation control.

Various ideas have been proposed for the in-gear control. For example, Japanese Laid-Open Patent Publication No. 6(1994)-109130 proposes a control apparatus which executes a first shift-control stage for executing a fast quick-fill by actuating the solenoid valve at a large duty cycle when a shift command to shift from the neutral range to the driving range is generated. Then, the control apparatus executes a second shift-control stage for reducing the pressure supplied to the clutch by actuating the solenoid valve at a predetermined duty-cycle reduction rate. Before completely engaging the clutch, it executes a third shift-control stage for minimizing the pressure by actuating the solenoid valve at a duty cycle determined on the basis of the rotational speed of the engine.

There is an in-gear control in which a higher speed range is temporarily set before establishing a first speed range (lowest speed range) when a shift is made from the neutral range to the forward range. This control, which is referred to as "squat control" because the car tends to move downwardly or "squat" upon a sudden torque change, smoothes out the change of output torque during the shift to the forward range, thereby alleviating the shift shock problem. Specifically, Japanese Laid-Open Patent Publication No. H3(1991)-6390 discloses such shift control method. When the shift lever is operated from the neutral range to the driving range while the vehicle speed is approximately zero with the accelerator pedal released and the parking brake applied, the lowest speed range (first speed range) is established after a higher speed range has been set temporarily.

As the above mentioned in-gear control is intended only to shift the transmission from the neutral range to the driving range smoothly, for example, if the shift lever is operated to the driving range soon after a shift from the driving range to the neutral range, the in-gear control of the prior art has experienced a problem of shift shock or shift delay.

When a shift is made from the driving range to the neutral range, the hydraulic pressure in the frictionally engaging element for establishing the driving range is released. However, if a shift is made to the driving range immediately after the shift from the driving range to the neutral range, then the frictionally engaging element for establishing the driving range is resupplied with hydraulic oil while some oil from the previous actuation is still remaining there. This condition makes the frictionally engaging element engage suddenly, resulting in a problem of shift shock.

For example, if the shift lever is operated in such a way with the control apparatus disclosed in Japanese Laid-Open Patent Publication No. H6(1994)-109130, then the first shift-control stage is executed while some oil is still remaining in the frictionally engaging element for establishing the driving range. Because the solenoid valve is actuated at a large duty cycle for a fast quick-fill, the actuation pressure of the frictionally engaging element reaches a high pressure quickly, thus causing a shift shock. In addition, as the shift control executed by this control apparatus requires some time to repeat the first through third shift-control stages for each shift, it tends to present a problem of shift delay as well.

Especially, if a shift is made to the driving range immediately after the shift from the first speed range to the neutral range with the above mentioned squat in-gear control, then a shift delay or a shift shock is all the more likely. The reason is that the squat in-gear control establishes the first speed range through temporary establishment of a higher speed range while it would be better for the control to keep the first speed range as is.

Automatic transmissions include not only the above described type which comprises gear trains but also a type which comprises a continuously variable speed mechanism. Since continuously-variable-type automatic transmissions also allow shifts to a forward range, neutral range, and reverse range in response to operation of the shift lever, the above mentioned same problem occurs when in-gear control is executed.

SUMMARY OF THE INVENTION

It is an object of the present invention to provide a shift control apparatus which is capable of executing in-gear control quickly without any shift shock.

Another object of the present invention is to provide a shift control apparatus which is capable of executing a smooth and quick in-gear shift even when a shift is made to a forward range immediately after a shift from the forward range to a neutral range.

Yet another object of the present invention is to provide a shift control apparatus which is capable of executing a smooth and quick in-gear shift in a squat in-gear control even when a shift is made to the forward range immediately after the shift from the forward range to the neutral range.

In order to achieve these objectives, the shift control apparatus of the present invention comprises engagement-controlling means for controlling engagement-actuation of frictionally engaging elements. In the shift control apparatus for a transmission capable of establishing at least a forward range and a neutral range, the engagement-actuation control by the engagement-controlling means for the frictionally engaging element to establish the forward range when a shift is made from the neutral range to the forward range comprises a plurality of control stages: for example, an invalid-stroke clearing stage to the clear invalid-stroke, an intermediate-pressure retaining stage to generate a pressure-command signal for setting an intermediate pressure, and a feedback stage to generate a pressure-command signal for executing a feedback control of an input rotational speed as a target value. When a shift is made to the forward range after a shift from the forward range to the neutral range, the engagement condition of the frictionally engaging element for establishing the forward range is detected by D-N-D detecting means. Then, one of the control stages is selected in correspondence with the condition detected, and the engagement-actuation control is executed from the control stage thus selected.

In this way, even if a shift is made to the forward range immediately after the shift from the forward range to the neutral range, the in-gear control is executed quickly and smoothly because the engagement-actuation control is executed in correspondence with the engagement condition of the frictionally engaging element for establishing the forward range, which is detected at the time of the shift to the forward range. For example, if hydraulic oil is still remaining in the frictionally engaging element for establishing the forward range when a shift is made to the forward range after a shift from the forward range to the neutral range, then the engagement-actuation control is executed from the intermediate-pressure retaining stage or the feedback stage because the invalid-stroke clearing stage is not necessary.

The D-N-D detecting means detects the engagement condition on the basis of the absolute value of the difference between the rate of rotational change of the engine (rotation of the pump of the torque converter) and the rate of rotational change of the turbine (rotation of the input member of the transmission mechanism), and the rotational speed of the turbine.

When a shift is made to the forward range immediately following the shift from the forward range to the neutral range, if the absolute value is detected smaller than a predetermined value and the rotational speed of the turbine is detected smaller than a predetermined rotational speed, then the engagement-actuation control is executed from the feedback stage; if the absolute value is detected equal to or greater than the predetermined value, then the engagement-actuation control is executed from the intermediate-pressure retaining stage; and if the absolute value is detected smaller than the predetermined value and the rotational speed of the turbine is detected equal to or greater than the predetermined rotational speed, then the engagement-actuation control is executed from the invalid-stroke clearing stage or the intermediate-pressure retaining stage. In this way, the control is executed smoothly and quickly.

In the case that the absolute value is detected smaller than the predetermined value and the rotational speed of the turbine is detected equal to or greater than the predetermined rotational speed, if the shift to the forward range is made during a second predetermined time period which starts when the absolute value has become smaller than the predetermined value and the rotational speed of the turbine has become equal to or greater than the predetermined rotational speed, then the engagement-actuation control is executed from the intermediate-pressure retaining stage; and if the shift to the forward range is made after the second predetermined time period, then the engagement-actuation control is executed from the invalid-stroke clearing stage.

Preferably, this second predetermined time period is variably set in correspondence with the temperature of the hydraulic oil, and it is set longer with decrease of the temperature.

This shift control apparatus can be applied not only to a gear-type automatic transmission which comprises a plurality of gear trains and frictionally engaging elements and establishes a predetermined gear train selectively through actuation of a respective frictionally engaging element, but also to a continuously-variable-type automatic transmission which comprises variable-width pulleys and a V belt and, by variably changing the widths of the pulleys, controls speed change.

The shift control apparatus of the present invention may also incorporate a squat control for establishing a first speed range via a second or higher speed range when a shift is made from the neutral range to the forward range.

In this case, the engagement-actuation control of the frictionally engaging element for establishing the second or higher speed range comprises a first invalid-stroke clearing stage, a first intermediate-pressure retaining stage and a releasing stage. The first invalid-stroke clearing stage clears the invalid stroke; the first intermediate-pressure retaining stage generates a pressure-command signal to set an intermediate pressure; and the releasing stage generates a pressure-command signal to reduce the pressure. Likewise, the engagement-actuation control of the frictionally engaging element for establishing the first speed range comprises a second invalid-stroke clearing stage, a second intermediate-pressure retaining stage and a feedback stage. The second invalid-stroke clearing stage clears the invalid stroke; the second intermediate-pressure retaining stage generates a pressure-command signal to set an intermediate pressure; and the feedback stage sets an input rotational speed as a target value.

The shift control apparatus of the present invention further comprises first D-N-D detecting means, first engagement-controlling means; second D-N-D detecting means and second engagement-controlling means. The first D-N-D detecting means detects the engagement condition of the frictionally engaging element for establishing the second or higher speed range when a shift is made to the forward range following a shift from the forward range to the neutral range. The first engagement-controlling means selects a control stage in correspondence with the engagement condition detected by the first D-N-D detecting means and executes the engagement-actuation control of the frictionally engaging element for establishing the second or higher speed range from the control stage selected. The second D-N-D detecting means detects the engagement condition of the frictionally engaging element for establishing the first speed range when the shift to the forward range is made. The second engagement-controlling means selects a control stage in correspondence with the engagement condition detected by the second D-N-D detecting means and executes engagement-actuation control of the frictionally engaging element for establishing the first speed range from the control stage selected.

These D-N-D detecting means detect the engagement condition on the basis of the absolute value of the difference between the rate of rotational change of the engine (rotation of the pump of the torque converter) and the rate of rotational change of the input member of the transmission mechanism (rotation of the turbine of the torque converter), and the rotational speed of the input member of the transmission mechanism (rotation of the turbine).

The engagement condition is detected when a shift is made to the forward range following a shift from the forward range to the neutral range. If the absolute value is detected smaller than a predetermined value and the rotational speed of the turbine is detected smaller than a predetermined rotational speed, then the first engagement-controlling means executes the engagement-actuation control from the releasing stage, and the second engagement-controlling means executes the engagement-actuation control from the feedback stage; if the absolute value is detected equal to or greater than the predetermined value, then the first engagement-controlling means executes the engagement-actuation control from the first intermediate-pressure retaining stage, and the second engagement-controlling means executes the engagement-actuation control from the second intermediate-pressure retaining stage; and if the absolute value is detected smaller than the predetermined value and the rotational speed of the turbine is detected equal to or greater than the predetermined rotational speed, then the first engagement-controlling means executes the engagement-actuation control from the first invalid-stroke clearing stage or the first intermediate-pressure retaining stage, and the second engagement-controlling means executes the engagement-actuation control from the second invalid-stroke clearing stage.

In this way, the respective engagement-actuation controls are executed in correspondence with the engagement condition detected at the time of the shift to the forward range, whereby a smooth and quick control is realized.

In the case that the absolute value is detected smaller than the predetermined value and the rotational speed of the turbine is detected equal to or greater than the predetermined rotational speed, if the shift to the forward range is made during a fifth predetermined time period which starts when the absolute value has become smaller than the predetermined value and the rotational speed of the turbine has become equal to or greater than the predetermined rotational speed, then the first engagement-controlling means executes the engagement-actuation control from the first intermediate-pressure retaining stage; and if the shift to the forward range is made after the fifth predetermined time period, then the first engagement-controlling means executes the engagement-actuation control from the first invalid-stroke clearing stage.

Preferably, this fifth predetermined time period is variably set in correspondence with the temperature of the hydraulic oil and set longer with decrease of the temperature.

In another shift control apparatus of the present invention, if the absolute value is detected smaller than a predetermined value and the rotational speed of the turbine is detected smaller than a predetermined rotational speed, then the first engagement-controlling means executes the engagement-actuation control from the releasing stage, and the second engagement-controlling means executes the engagement-actuation control from the feedback stage; if the absolute value is detected equal to or greater than the predetermined value, then the first engagement-controlling means executes the engagement-actuation control from the first invalid-stroke clearing stage, and the second engagement-controlling means executes the engagement-actuation control from the second intermediate-pressure retaining stage; and if the absolute value is detected smaller than the predetermined value and the rotational speed of the turbine is detected equal to or greater than the predetermined rotational speed, then the first engagement-controlling means executes the engagement-actuation control from the first invalid-stroke clearing stage, and the second engagement-controlling means executes the engagement-actuation control from the second invalid-stroke clearing stage.

In the case that the absolute value is detected smaller than the predetermined value and the rotational speed of the turbine is detected equal to or greater than the predetermined rotational speed, following the shift from the forward range to the neutral range made while the first engagement-controlling means is actuating, if the shift to the forward range is made during a sixth predetermined time period which starts when the first engagement-controlling means is interrupted of the actuation, then the first engagement-controlling means executes the engagement-actuation control from the first intermediate-pressure retaining stage; and if the shift to the forward range is made after the sixth predetermined time period, then the first engagement-controlling means executes the engagement-actuation control from the first invalid-stroke clearing stage.

It is preferable that the sixth predetermined time period be variably set in correspondence with the temperature of the hydraulic oil. It is set longer with decrease of the temperature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION OF THE PREFERRED EMBODIMENTS

Figure 1:
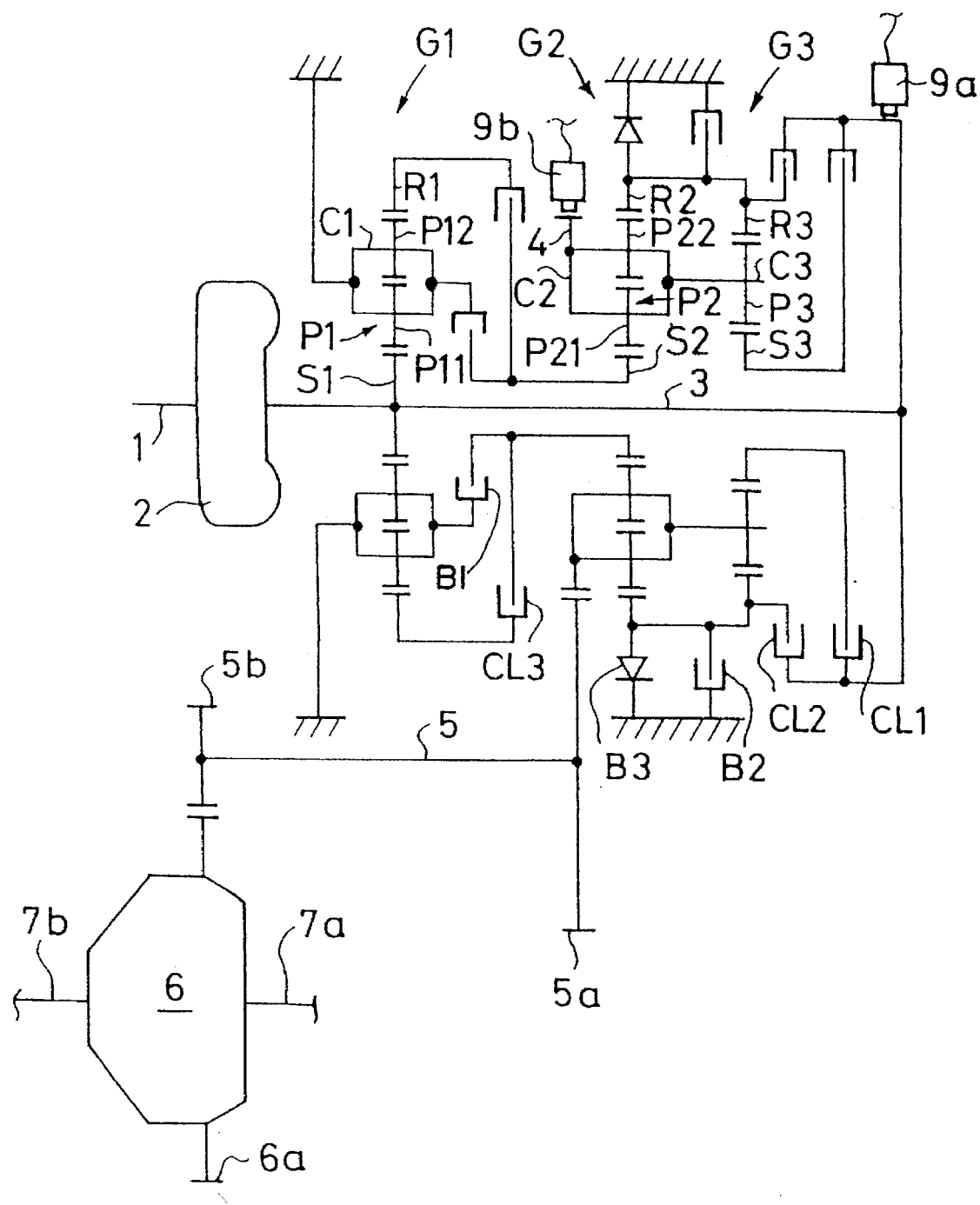
FIG. 1 is a schematic diagram of an automatic transmission which is controlled by a shift control apparatus according to the present invention.

FIG. 1 shows a power transmission system for use in an automatic transmission which is controlled by a shift control apparatus of the present invention.

This transmission comprises a torque converter 2 connected to an engine output shaft 1, an input shaft 3 connected to a turbine shaft of the torque converter 2, and a planetary transmission mechanism mounted on the input shaft 3.

The planetary transmission mechanism has first, second, and third planetary gear trains G1, G2 and G3 juxtaposed on the input shaft 3. The first, second, and third planetary gear trains comprise respective first, second, and third sun gears S1, S2 and S3 positioned centrally; respective first, second, and third planetary pinions P1, P2 and P3 in mesh with the first, second and third sun gears S1, S2 and S3, respectively, and revolving therearound while rotating about their own axes; respective first, second, and third carriers C1, C2 and C3 which rotatably support the respective planetary pinions P1, P2 and P3 and rotate therewith around the sun gears S1, S2 and S3, respectively; and respective first, second and third ring gears R1, R2 and R3, whose internal gear teeth mesh with the planetary pinions P1, P2 and P3, respectively.

The first and second planetary gear trains G1 and G2 are double-pinion planetary gear trains. The first and second pinions P1 and P2 comprise two pinions each P11 and P12, and P21 and P22, respectively.

The first sun gear S1 is connected to the input shaft 3 at all times. The first carrier C1 is fixedly retained to a housing and coupled to the second sun gear S2 through a first brake B1. Therefore, the first brake B1, when actuated, fixedly retains the second sun gear S2. The first ring gear R1 is engageably and disengageably coupled to the second sun gear S2 through a third clutch CL3. The second carrier C2 is coupled with the third carrier C3 at all times, and they are coupled to an output gear 4 at all times. The second ring gear R2 is coupled with the third ring gear R3 at all times, and they can be held against rotation by a second brake B2. Besides this second brake B2, they are also connected to the housing through a one-way brake B3, thus not rotatable in a forward drive direction. Furthermore, the second and third ring gears R2 and R3 are engageably and disengageably connected to the input shaft 3 through a second clutch CL2, and the third sun gear S3 is engageably and disengageably connected to the input shaft 3 through a first clutch CL1.

Furthermore, input and output rotation sensors 9a and 9b are provided as shown in the figure.

In the above described transmission, shifts of speed ranges are carried out by selectively engaging and disengaging the first, second and third clutches CL1, CL2 and CL3 and the first and second brakes B1 and B2. Specifically, five forward speed ranges (1ST, 2ND, 3RD, 4TH and 5TH) and one reverse speed range (REV) can be established by selectively engaging the clutches and brakes as indicated in Table 1 below.

In the table, the second brake B2 in the 1ST speed range is marked by a circle in parentheses to indicate that the 1ST speed range can be established by the one-way brake B3 with or without the engagement of the second brake B2. This means that when the first clutch CL1 is engaged, the, 1ST speed range can be established without the engagement of the second brake B2. However, since the one-way brake B3 does not allow power transmission in the direction opposite to a forward drive direction, no engine brake is available in the 1ST speed range which is established without the engagement of the second brake B2. On the other hand, engine brake is available in the 1ST speed range if it is established with the engagement of the second brake B2. Thus, the 1ST speed range in the forward range D does not allow engine brake.

TABLE 1

| Speed range | CL1 | CL2 | CL3 | B1 | B2 |
| --- | --- | --- | --- | --- | --- |
| 1ST | O | | | | (O) |
| 2ND | O | | | O | |
| 3RD | O | | O | | |
| 4TH | O | O | | | |
| 5TH | | O | O | | |
| REV | | | O | | O |

Figure 2:
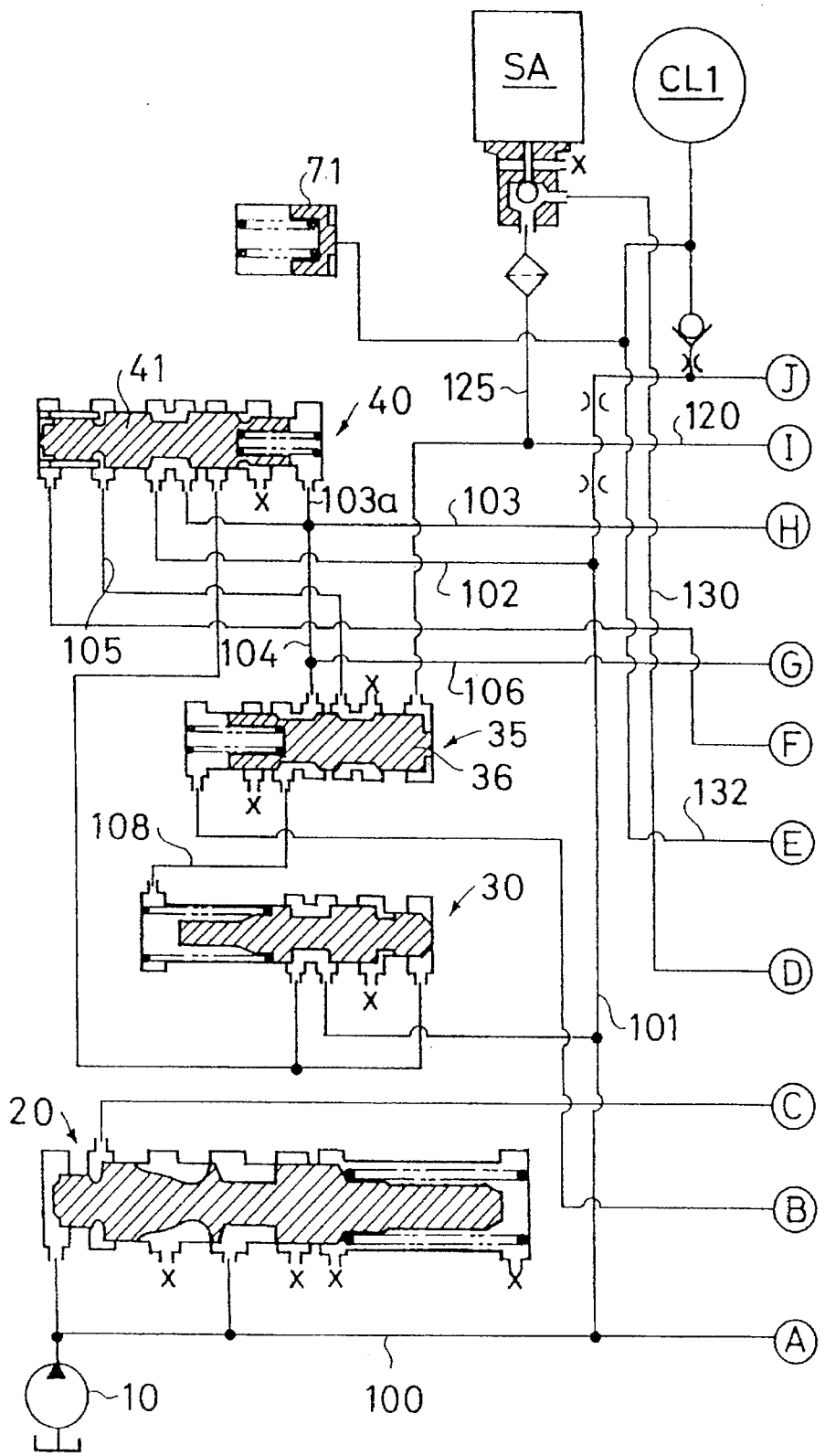
FIG. 2 is a partial hydraulic circuit diagram showing components of the shift control apparatus.
Figure 3:
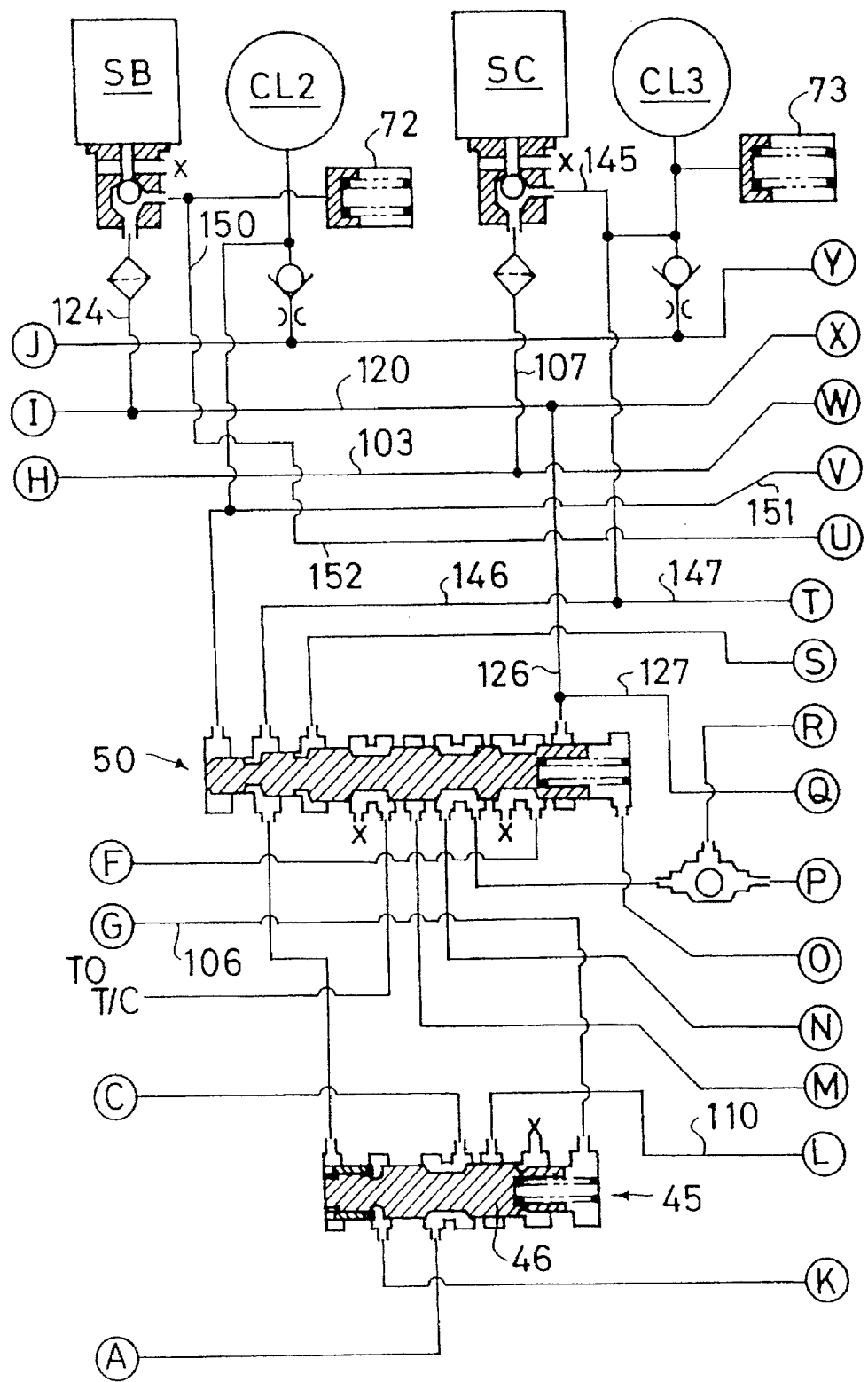
FIG. 3 is another partial hydraulic circuit diagram showing components of the shift control apparatus.
Figure 4:
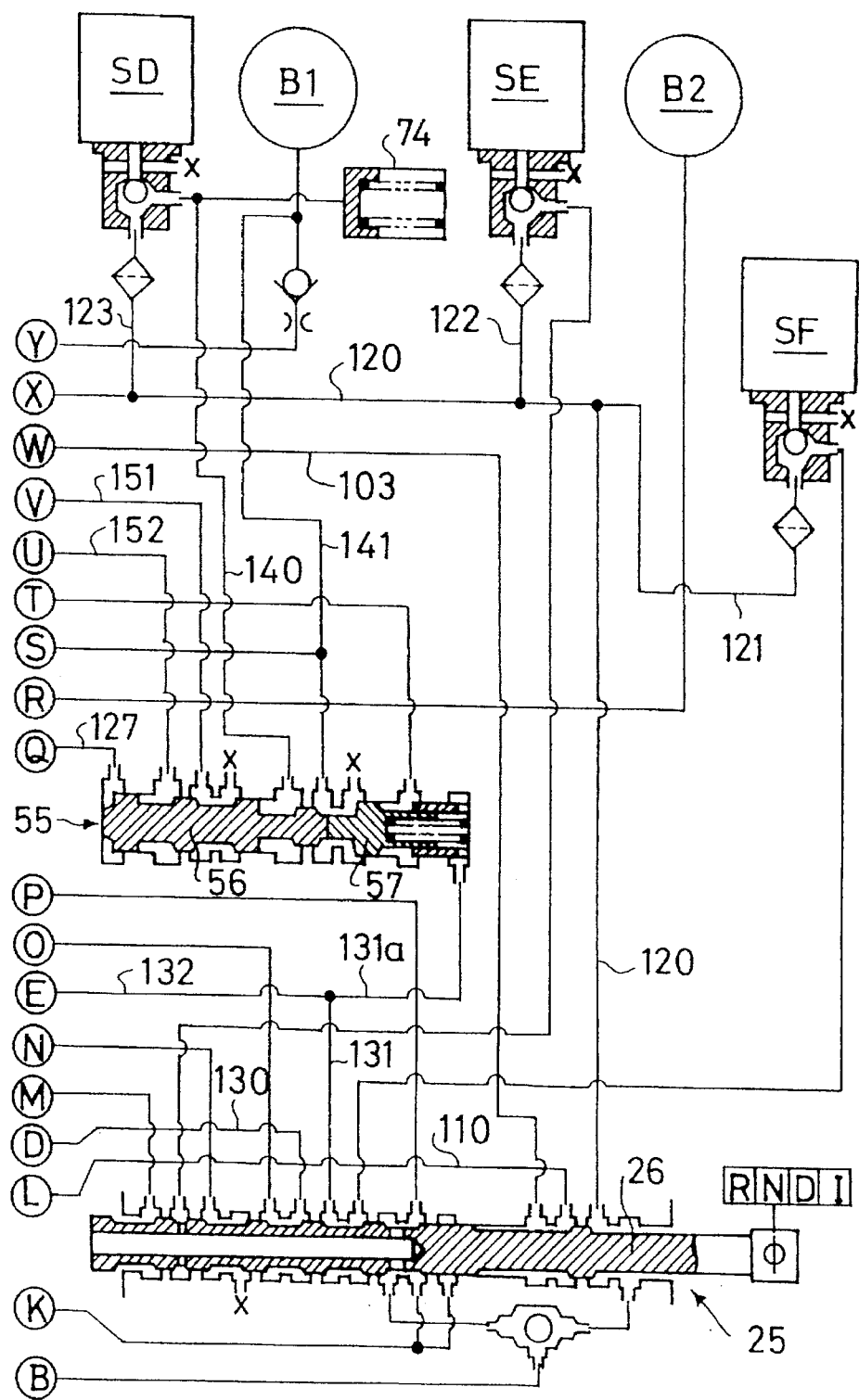
FIG. 4 is yet another partial hydraulic circuit diagram showing components of the shift control apparatus.

With reference to FIGS. 2, 3 and 4, a control apparatus for controlling engagement and disengagement of the first, second and third clutches CL1, CL2 and CL3 and the first and second brakes B1 and B2 will be described below. Each of the three drawings shows a respective portion of the control apparatus, composing a unified hydraulic circuit. Lines terminated with an identical alphabet letter (A~Y) in a circle in each drawing are continuous to each other, and lines marked with "X" are connected to a drain.

This control apparatus is supplied with hydraulic oil by a pump 10. This oil is first adjusted to a line pressure Pl by a regulator valve 20 and sent out through a line 100 as shown in the figures.

Besides this regulator valve 20, the control apparatus has a manual valve 25; six solenoid valves SA~SF; six hydraulic valves 30, 35, 40, 45, 50 and 55; and four accumulators 71, 72, 73 and 74. The manual valve 25 is connected to a shift lever at the driver's seat, and it is manually operated by the driver. The solenoid valves SA, SC and SF are normally-open type, so these valves are open while the solenoids are not energized. The solenoid valves SB, SD and SE are normally-close type, so these valves are closed while the solenoids are not energized.

In the following description, the hydraulic valves are each referred to as reducing valve 30, L-H shift valve 35, FWD pressure-switching valve 40, REV pressure-switching valve 45, delivery valve 50, and relief valve 55.

These hydraulic valves are actuated in response to the operation of the manual valve 25 and the solenoid valves SA~SF for the purpose of executing a shift control. Table 2 below shows the relation of the operation of the solenoid valves to the establishment of the speed ranges. "ON" and "OFF" in the table represent the turning on and off, respectively, of the solenoids. The operation of the solenoid valve SF is not shown in the table because it is not used for establishing a speed range but is used only for increasing the line pressure when the reverse speed range is established.

TABLE 2

| Speed ranges | SOLENOID-OPERATED VALVE | | | | |
| --- | --- | --- | --- | --- | --- |
| | SA | SB | SC | SC | SE |
| Type | N/O | N/C | N/O | N/C | N/C |
| 1ST | OFF | OFF | ON | OFF | OFF (ON upon Engine braking) |
| 2ND | OFF | OFF | ON | ON | OFF (ON upon Engagement of L/C) |

TABLE 2-continued

| Speed ranges | SOLENOID-OPERATED VALVE | | | | |
| --- | --- | --- | --- | --- | --- |
| | SA | SB | SC | SC | SE |
| 3RD | OFF | OFF | OFF | OFF | OFF (ON upon Engagement of L/C) |
| 4TH | OFF | ON | ON | OFF | OFF (ON upon Engagement of L/C) |
| 5TH | ON | ON | OFF | OFF | OFF (ON upon Engagement of L/C) |
| REV | OFF | OFF | OFF | OFF | OFF |

N/O: Normally-open; N/C: Normally-closed; and L/C: Lockup clutch.

First a description will be given of a shift control which takes place when the D range (forward range) is selected with the shift lever moving a spool 26 in the manual valve 25 from position N, the position of the spool 26 shown in FIG. 4, to position D. When a hook on the right end of the spool 26 is positioned at "D", oil under the line pressure P1 is delivered to the manual valve 25 through lines 101 and 102 branched from the line 100 and then through a spool groove in the FWD pressure-switching valve 40 and a line 103. Then, the line pressure P1 is delivered through a groove on the spool 26 to lines 110 and 120. In this instance, the line 110 is closed off by the REV pressure-switching valve 45.

The oil under the line pressure P1 is then supplied from the line 120 to the solenoid valves SF, SE, SD, SB and SA through branched lines 121, 122, 123, 124 and 125, respectively. The line pressure P1 in the line 120 also acts on the right end of the L-H shift valve 35, moving a spool 36 thereof to the left. A line 126 branching from the line 120 is connected to the right end of the delivery valve 50, and a line 127 branching from the line 126 is connected to the left end of the relief valve 55, whereby spools 56 and 57 in the relief valve 55 are shifted to the right.

A line 103a branching from the line 103 is connected to the right end of the FWD pressure-switching valve 40 such that the line pressure P1 pushes a spool 41 in the FWD pressure-switching valve 40 to the left. The line pressure P1 is supplied to the left end of the FWD pressure-switching valve 40 through a line 104 branching from the line 103, through a groove on the spool 36 in the L-H shift valve 35, which has been shifted to the left, and then through a line 105. A line 106 branching from the line 104 is connected to the right end of the REV pressure-switching valve 45 such that a spool 46 in the REV pressure-switching valve 45 is kept shifted to the left by the line pressure P1.

A line 107 branching from the line 103 is connected to the solenoid valve SC, to supply the line pressure P1 thereto.

In the above described ways, the line pressure P1 is supplied to each of the solenoid valves SA~SF, which are controlled to open or close for the purpose of controlling the supply of the line pressure P1.

First, establishing the 1ST speed range will be described. As the solenoid valve SF is not involved in establishing a forward range, only the solenoid valves SA~SE will be included in the description as shown in Table 2.

With reference to Table 2, only the solenoid valve SC is turned on, and the other solenoid valves are turned off for the 1ST speed range. As a result, only the solenoid valve SA opens, and the other solenoid valves close. When the solenoid valve SA opens, the line pressure P1 is supplied from the line 125 to a line 130 and then to a line 131 through a groove on the spool 26 at position D of the manual valve 25.

A line 131a branching from the line 131 is connected to the right end of the relief valve 55 such that the line pressure P1 acts on the right end of the relief valve 55. Furthermore, the line pressure P1 is supplied to the first clutch CL1 through a line 132 branching from the line 131, whereby the first clutch CL1 is actuated for engagement, and pressure change which occurs in the first clutch CL1 is regulated by the first accumulator 71.

The second clutch CL2 is connected to the drain through the relief valve 55, whose spools 56 and 57 are shifted to the right, and through the solenoid valve SB. The third clutch CL3 is connected to the drain through the solenoid valve SC, and the first brake B1 is connected to the drain through the relief Valve 55 and the solenoid valve SD. The second brake B2 is connected to the drain through the manual valve 25. Therefore, only the first clutch CL1 engages to establish the 1ST speed range.

Next, a description will be made of establishing the 2ND speed range. The solenoid valve SD, which was off for establishing the 1ST speed range, is turned on to open. As a result, the line pressure P1 is supplied to the first brake B1 from the line 123 through a line 140 and the relief valve 55, whose spools 56 and 57 are shifted to the right, and through a line 141. Therefore, the first clutch CL1 and the first brake B1 engage to establish the 2ND speed range.

For establishing the 3RD speed range, the solenoid valve SC is switched from on to off, and the solenoid valve SD is returned to off. Because the solenoid valve SD is returned to off, the first brake B1 is released. As the solenoid valve SC is turned off and opened, the line pressure P1 is supplied to the third clutch CL3 from the line 107 through a line 145. As a result, the third clutch CL3 engages to establish the 3RD speed range.

At the same time, the line pressure P1 acts on the left-hand portion of the delivery valve 50 through a line 146 branching from the line 145 and also acts on the right end of the relief valve 55 through a line 147 branching from the line 145.

For establishing the 4TH speed range, the solenoid valve SB is switched from off to on, and the solenoid valve SC is also turned on. As the solenoid valve SC is returned to on, the third clutch CL3 is released. As the solenoid valve SB opens, the line pressure P1 is supplied to the second clutch CL2 from the line 124 through lines 150 and 152 and a groove on the spool 56 shifted to the right in the relief valve 55 and through a line 151. As a result, the second clutch CL2 engages to establish the 4TH speed range.

For establishing the 5TH speed range, the solenoid valve SA is turned on, and the solenoid valve SC is turned off. As the solenoid valve SA is switched from off to on, the supply of the line pressure P1 to the line 130 is cut off, and the first clutch CL1 is connected to the drain through the solenoid valve SA. As a result, the first clutch CL1 is released. As the solenoid valve SC opens, the third clutch CL3 engages as described previously. As a result, the 5TH speed range is established.

The clutches and brakes are controlled for engagement and disengagement in the manner described above. Now, an engagement control is described for a shift from the N range (neutral range) to the D range (forward range) which is carried out when the shift lever is operated from position N to position D, with reference to a timing chart in FIG. 5 and a flowchart in FIGS. 6 and 7.

As shown in the flowchart, this shift of the shift lever from position N to position D is detected by the shift control apparatus at step S2. Here, if the shift is not to the D range, then the control flow returns since shifts other than to the D range are not targeted in this control. After the detection of the shift to the D range, determination is made whether the shift pattern is D-N-D or not, and if it is, then the phase of the D-N-D pattern is classified and flagged at step S50. This routine of classifying and flagging is executed for the D-N-D shift pattern, in which a shift to the D range is made immediately after the shift from the D range to the N range. Here, the ordinary N-D shift pattern is first described, and then the routine of step S50 will be described.

After a shift of the ordinary N-D pattern is flagged as F=0 at step S50, the control flow proceeds through steps S4, S6 and S8 to step S10 to start a timer t1. Then, the solenoid valves SA and SC, which are both normally open type, are turned off at step S12. As a result, both solenoid valves are totally opened to supply hydraulic oil to the first and third clutches CL1 and CL3 so that the oil cylinders of the clutches are rapidly filled with oil. The pistons of the clutches are shifted quickly clearing their invalid strokes. The term "invalid stroke" means a piston stroke in the cylinder of an engaging element through which no engaging force is applied on the engaging element (such as clutches and brakes).

Figure 5:
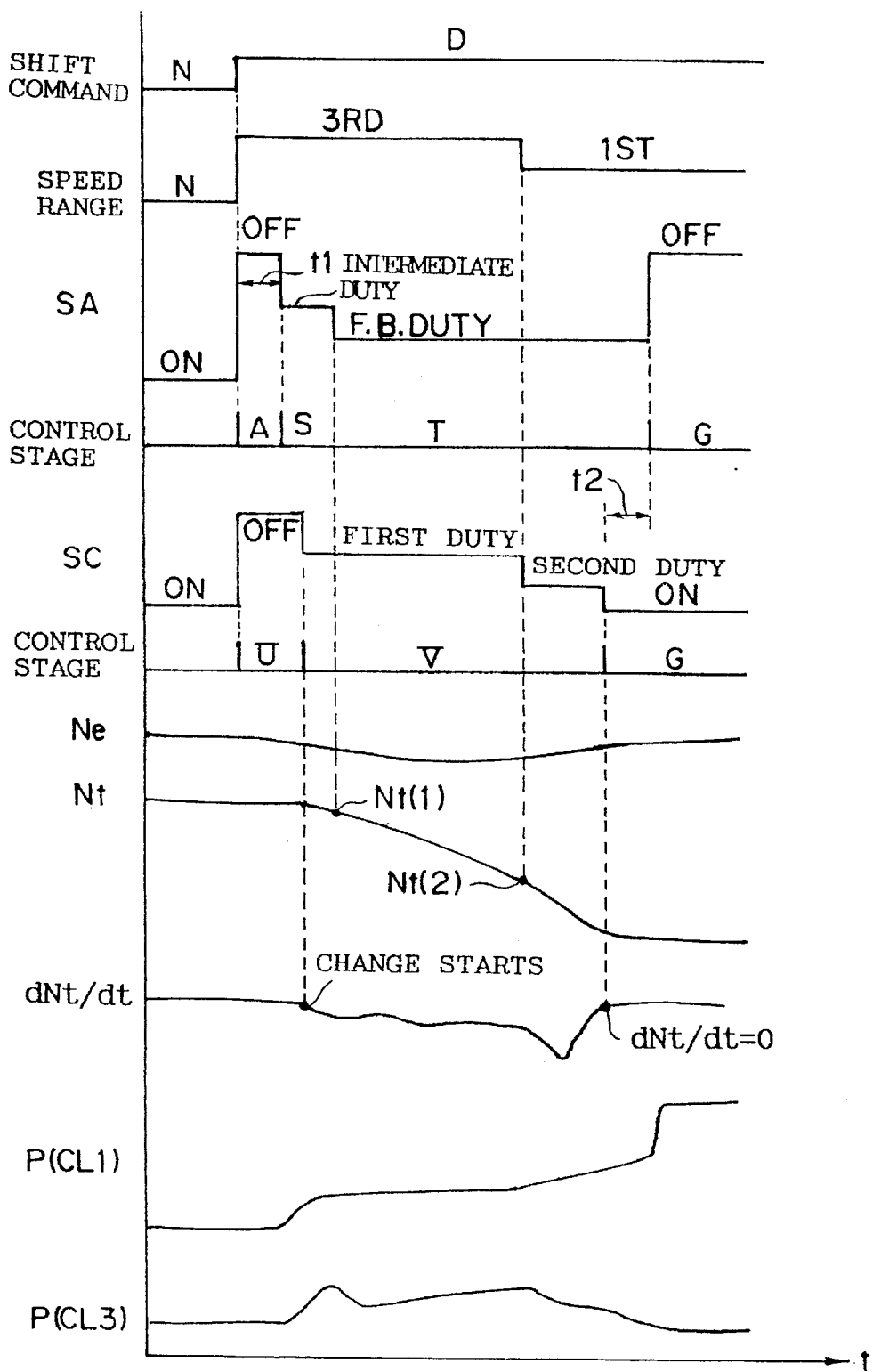
FIG. 5 is a chart showing the actuation condition of solenoid valves and chronological changes of various parameters during a shift control executed by the shift control apparatus.

As shown in FIG. 5, the control stages for the solenoid valve SA and the solenoid valve SC at this moment are referred to as "control stage A" and "control stage U", respectively.

The control stage A is kept for a time set in the first timer t1. After the elapse of the time, the control flow proceeds to step S16. While the solenoid valve SC is kept turned off, the solenoid valve SA is actuated at an intermediate duty cycle. The intermediate duty cycle is a duty cycle for the solenoid valve to generate a pressure to keep the clutch in a preengagement condition. Because the supply of oil to the first clutch CL1 is constricted while the supply of oil to the third clutch CL3 is continued at the same rapid rate, the third clutch CL3 starts engaging first.

In this control, the engine rotational speed Ne, the turbine rotational speed Nt of the torque convertor and the rate of turbine rotational change dNt/dt are being detected. When the turbine rotational speed Nt starts changing, i.e., a start of change is detected in the rate of turbine rotational change dNt/dt at step S18, the control flow proceeds to step S20 to actuate the solenoid valve SC at a first duty cycle (constant value), which control stage is referred to as "control stage V". The first duty cycle is a duty cycle for the solenoid valve to generate a pressure to engage the third clutch CL3 loosely. With this pressure, the third clutch CL3 is kept in a predetermined engagement condition (loosely engaging condition) to establish the 3RD speed range.

If the turbine rotational speed Nt decreases or changes (to Nt(1)) by a predetermined amount from the rotational speed detected at the time of the shift to the D range, then the control flow proceeds from step S22 to step S24 to execute a feedback duty-cycle control on the solenoid valve SA. This control stage is referred to as "control stage T". This feedback duty-cycle control is a feedback control which sets target values for the turbine rotational speed Nt and the rate of turbine rotational change dNt/dt.

Thereafter, if the turbine rotational speed Nt decreases to a predetermined rotational speed Nt(2), then the control flow proceeds from step S26 to step S28. The solenoid valve SC is actuated at a second duty cycle. This second duty cycle is a duty cycle to further reduce the actuation pressure P(CL3) of the third clutch CL3.

When the rate of turbine rotational change dNt/dt becomes almost zero, the control flow proceeds from step S30 to step S32 to start a second timer t2. Then, the solenoid valve SC is turned on at step S34 to release the third clutch CL3 completely. The second timer t2 is set for the purpose of providing a waiting time for the first clutch CL1 to engage completely. When the time set in the second timer t2 elapses, the control flow proceeds from step S36 to step S38 to turn off the solenoid valve SA, thus maximizing the actuation pressure of the first clutch CL1. As a result, the first clutch CL1 engages fully. As such, there is no shift shock even though the actuation pressure is made maximum.

In the above described way, the ordinary in-gear squat control is carried out smoothly.

The shift control apparatus of the present invention is capable of carrying out the in-gear control smoothly for the above mentioned D-N-D shift, in which a shift to the D range is made soon after the shift from the D range to the N range.

After the determination of the shift pattern as D-N-D, the phase of the D-N-D shift pattern is classified and flagged at step S50.

Figure 8:
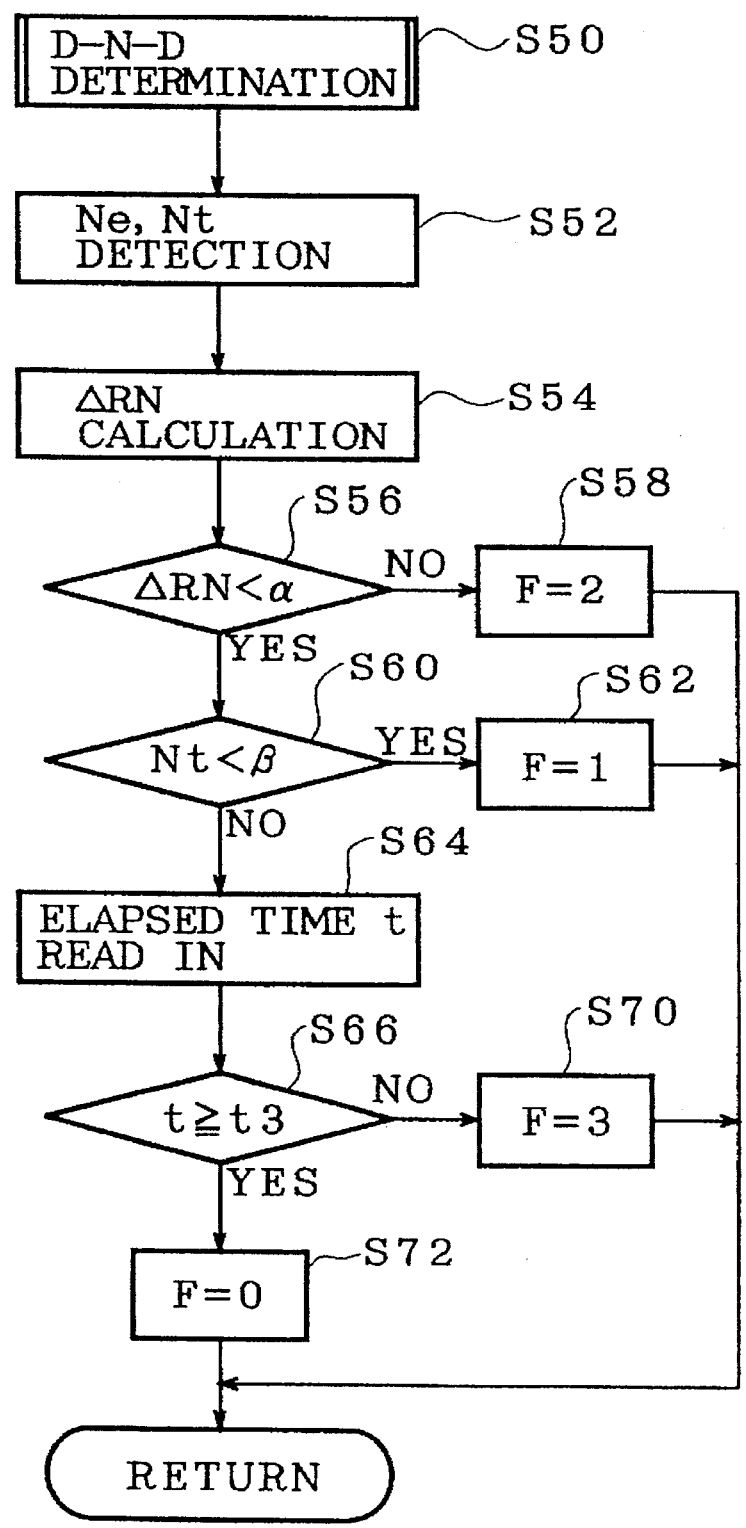
FIG. 8 is yet another flowchart showing processes effected by the shift control apparatus.

The control processes included in the routine of step S50 are shown in FIG. 8. Now, the engine rotational speed Ne and the turbine rotational speed Nt are detected at step S52. Calculation is made for the absolute value ΔRN (=I dNe/dt−dNt/dt I) of the difference between the rate of engine rotational change dNe/dt and the rate of turbine rotational change dNt/dt at step S54. Then, determination is made whether this absolute value ΔRN is smaller than a first predetermined value α or not at step S56, and whether the turbine rotational speed Nt is smaller than a second predetermined value β or not at step S60.

Figure 9:
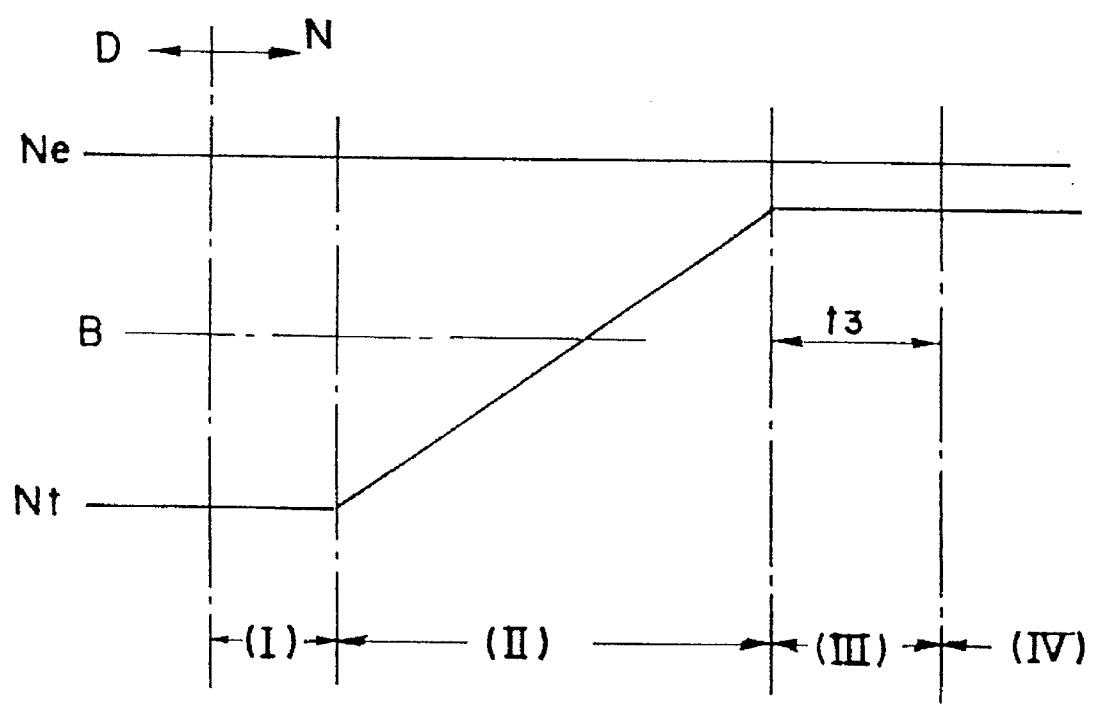
FIG. 9 is a graph showing the chronological change of the rotational speeds of the engine and turbine experienced when a shift is made from the D range to the N range.

FIG. 9 shows changes in the engine rotational speed Ne and turbine rotational speed Nt which take place after a shift is made to the N range while the vehicle is stationary in the D range with the accelerator pedal released. The condition shown in the figure reflects the ordinary out-gear control, which is carried out while the vehicle is stationary with the accelerator pedal released.

While the vehicle is stationary in the D range with the accelerator pedal released, the engine is idling at, for example, about 750 r.p.m., and the turbine is stationary. When the shift to the N range is made in this condition, the turbine rotational speed is stationary for a little while until the clutch begins to disengage. As the clutch is being released, the turbine rotational speed increases gradually, and it becomes constant when it reaches a rotational speed a little below the engine rotational speed. The turbine rotational speed is always a little smaller than the engine rotational speed because there is some slip in the torque converter.

In this change of the turbine rotation, the period after the shift to the N range is made and before the turbine rotational speed starts changing is referred to as first phase (I), the period while the turbine rotational speed is increasing is referred to as second phase (II), the period after the turbine rotational speed becomes stable near the engine rotational speed and before a predetermined time period t3 elapses is referred to as third phase (III), and the period thereafter is referred to as fourth phase (IV).

In the first phase (I), the absolute value ΔRN (=I dNe/dt−dNt/dt I) is small, and the turbine rotational speed Nt is also small. In the second phase (II), the absolute value , ΔRN becomes large, and the turbine rotational speed Nt increases gradually. In the third and fourth phases (III) and (IV), the absolute value ΔRN is small, but the turbine rotational speed Nt is large.

When the shift from the N range to the D range is made in the D-N-D shift, phase determination is carried out on the basis of the absolute value ΔRN and the turbine rotational speed Nt. In correspondence with the phase thus determined, the control apparatus carries out the in-gear control smoothly by executing various patterns of shift control.

This determination is executed at steps S56 and S60. If the absolute value ΔRN is greater than the first predetermined value α, then the condition is judged as in the second phase (II) and flagged as F=2 at step S58. If the absolute value ΔRN is smaller than the first predetermined value α and the turbine rotational speed Nt is smaller than the second predetermined value β, then it is judged as in the first phase (I) and flagged as F=1 at step S62.

On the other hand, if the absolute value ΔRN is smaller than the first predetermined value α but the turbine rotational speed Nt is greater than the second predetermined value β, then the condition is judged as in the third or fourth phase (III) or (IV). Then, the elapsed time t is read in at step S64. This elapsed time t is the time counted after the absolute value ΔRN has become smaller than the first predetermined value α and the turbine rotational speed Nt has become equal to or greater than the second predetermined value β (i.e., after the transition from the second phase (II) to the third phase (III)). This elapsed time t is determined in comparison with the predetermined time period t3 at step S66. If the elapsed time t is smaller than the predetermined time period t3 (t<t3), then the condition is judged as in the third phase (III) and flagged as F=3 at step S70. If the elapsed time t is equal to or greater than the predetermined time period t3 (t≧t3), then it is judged as in the fourth phase (IV) and flagged as F=0 at step S72.

Preferably, this predetermined time period t3 should be set variably in correspondence with the temperature of the hydraulic oil. When the temperature is low, the oil has a high viscosity. The change of viscosity affects the time required for the pressure cylinder of the first clutch CL1 to be evacuated of oil. This viscosity difference also affects the time required for the piston to move for clearing its invalid stroke. Therefore, the lower the temperature of the hydraulic oil, the longer the predetermined time period t3 is set.

After determining and flagging the phase, flag determination is executed at steps S4 through S8.

In the case that the shift from the N range to the D range takes place during the first phase (I) (i.e., F=1), the first clutch CL1 is in engagement. Therefore, the control flow proceeds from step S4 through step S44 to step S32. While the solenoid valve SC is kept turned on, the solenoid valve SA is actuated in the feedback duty-cycle control for the time period which is set in the second timer t2. After the elapse of the time period, the solenoid valve SA is turned off.

In the case that the shift from the N range to the D range takes place during the second phase (II) (i.e., F=2), the first clutch CL1 is being released gradually. Therefore, the control flow proceeds from step S6 through step S42 to step S24. The in-gear control is executed from the feedback duty-cycle control of the solenoid valve SA and the first duty-cycle control of the solenoid valve SC and continued from step S24 through the steps shown in FIG. 7.

Figure 6:
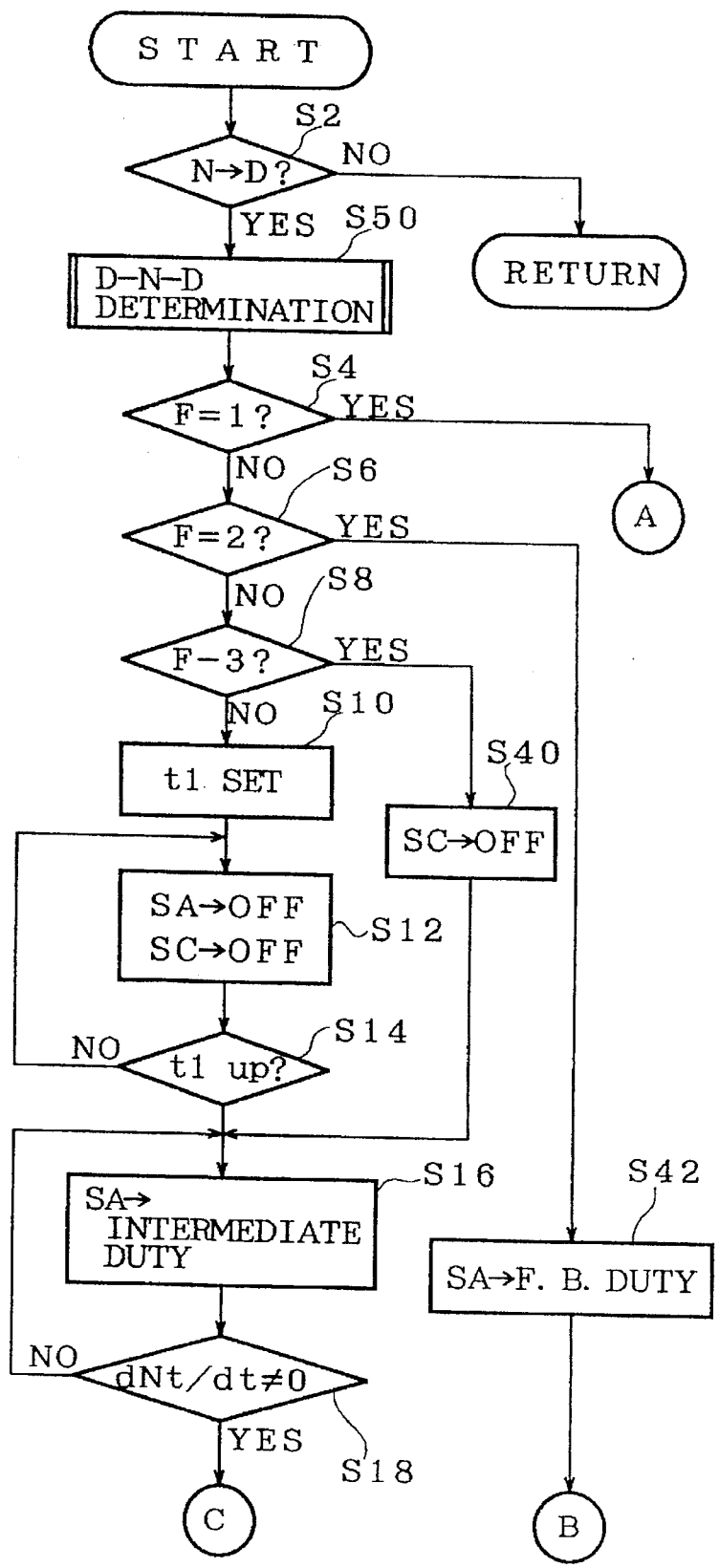
FIG. 6 is a partial flowchart showing processes effected by the shift control apparatus.
Figure 7:
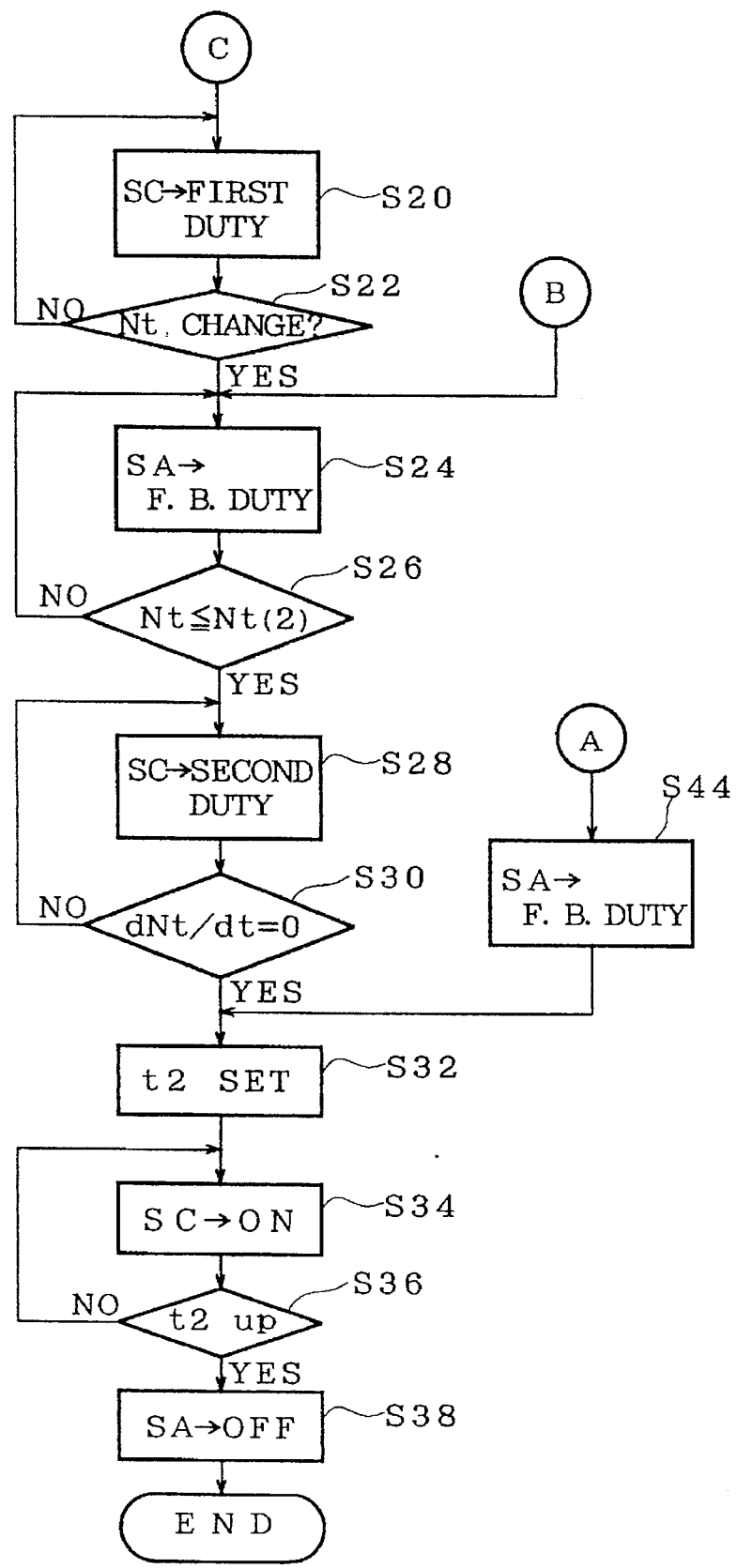
FIG. 7 is another partial flowchart showing processes effected by the shift control apparatus.

In the case that the shift from the N range to the D range takes place during the third phase (III) (i.e., F=3), the first clutch CL1 has been almost released but its invalid stroke is still substantially small. Therefore, the control flow proceeds through step S40 to step S16 to initiate the in-gear control by turning the solenoid valve SC off and by actuating the solenoid valve SA in the intermediate duty-cycle control. Then, the control flow proceeds through the steps following step S16, which are shown in FIGS. 6 and 7.

If the shift from the N range to the D range takes place during the fourth phase (IV) (i.e., F=0), then all the control stages of the in-gear control are executed from step S10.

Even in the case of D-N-D shift, the in-gear control is carried out smoothly by the shift control apparatus because an optimal control is executed in correspondence with the engagement condition of the clutch at the time of the shift from the N range to the D range.

Figure 10:
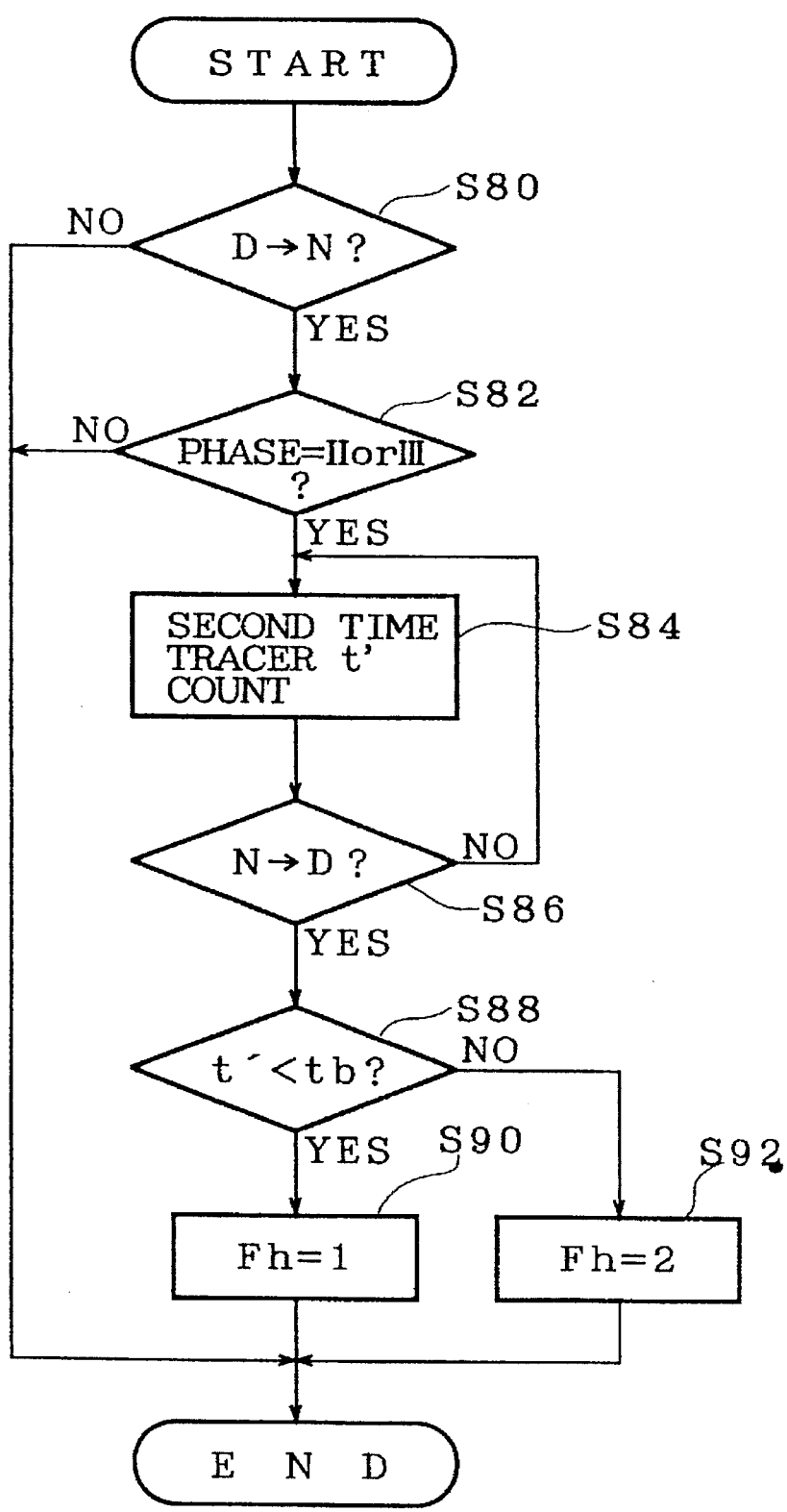
FIG. 10 is a flowchart showing another set of processes effected by the shift control apparatus.

However, in the above described squat in-gear D-N-D shift, it is difficult to determine the engagement condition of the third clutch CL3 during the second or third phase after a shift is made from the D range to the N range. The third clutch CL3 is the engaging element for establishing a higher speed range in the squat in-gear control. Therefore, the control stage from which the engagement control is to be executed for the third clutch CL3 can be determined as described in FIG. 10.

In this case, determination is made first whether the shift is from the D range to the N range or not at step S80. If it is so, then phase determination is executed to judge whether the condition is in the second or third phase at step S82. If it is judged as in the second or third phase, then a second time tracer t' starts counting the time elapsed until a shift from the N range to the D range is made at steps S84 and S86. Then, the elapsed time counted by the second time tracer t' is determined whether it is smaller than a predetermined time period tb which is set based on the time required for the third clutch CL3 to be discharged of hydraulic oil at step S88. If the time elapsed is smaller than the predetermined time period tb (t'<tb), then a judgment flag Fh=1 is assigned at step S90. If the time elapsed is equal to or greater than the predetermined time period tb (t'≧tb), then a judgment flag Fh=2 is assigned at step S92. If the determination made at step S80 or at step S82 is NO, then the judgment flag is kept as Fh=0.

Following the above routine, the judgment flag Fh is determined before setting the control stage to be executed for the solenoid valve SC in the control flow shown in FIGS. 6 and 7. If the judgment flag Fh is Fh=1, then the D-N-D in-gear control is started from the control stage V, in which the solenoid valve SC for the third clutch CL3 is actuated in the first duty-cycle control. If the judgment flag Fh is Fh=2, then the D-N-D in-gear control is started from the control stage U, in which the solenoid valve SC is turned off. If it is Fh=0, then all the control stages shown in FIGS. 6 and 7 are executed.

Figure 11:
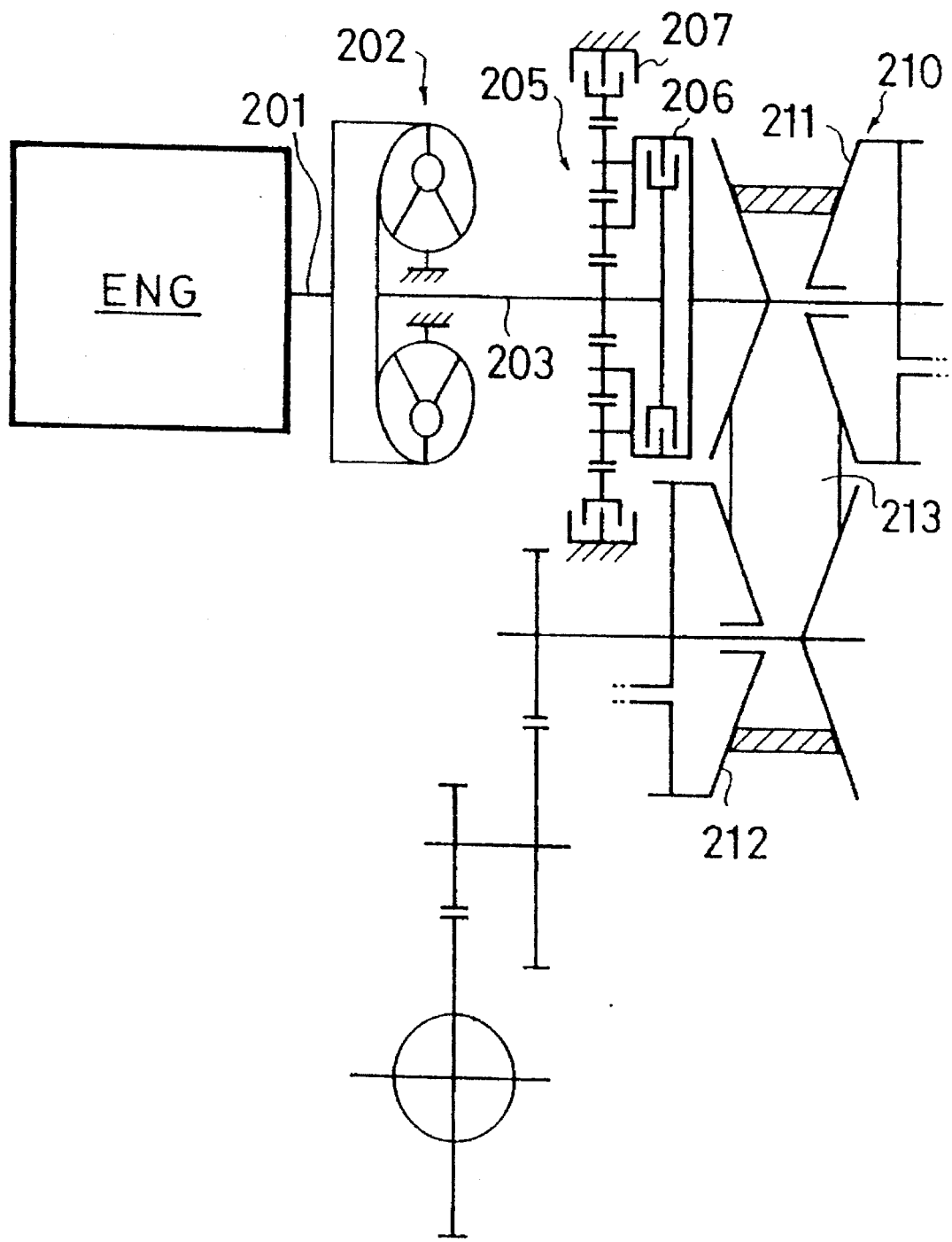
FIG. 11 is a schematic view of another automatic transmission, which is controlled by the shift control apparatus according to the present invention.

With the addition of this control, even in the case that a shift to the D range is made following the shift from the D range to the N range while there is still a pressure remaining in the third clutch CL3 (i.e., during the second or third phase), the third clutch CL3 is effectively prevented from experiencing a shock when it engages again because the engagement-actuation control for the third clutch CL3 is appropriately executed.

in the above embodiment, a gear-type automatic transmission has been described comprising a plurality of planetary gears constituting a plurality of power transmission paths, and automatic shifting is carried out through selective actuation of frictionally engaging elements such as clutches and brakes. However, the control apparatus according to the present invention can be applied not only to such gear-type automatic transmission but also to a continuously-variable-type automatic transmission such as shown in FIGS. 11 and 12.

The following are brief descriptions of continuously-variable-type automatic transmissions. The automatic transmission shown in FIG. 11 comprises a torque converter 202 coupled to an output shaft 201 of an engine ENG, a forward/reverse-switching mechanism 205 including a double-pinion planetary gear coupled to an output shaft of the torque converter 202, and a continuously variable speed mechanism 210 connected with the forward/reverse-switching mechanism 205. The forward/reverse-switching mechanism 205, which is connected to a turbine shaft 203 of the torque converter 202, includes a forward clutch 206 and a reverse brake 207. This forward clutch 206 is engaged to establish a forward range (selecting a forward power transmission path), and the reverse brake 207 is engaged to establish a reverse range (selecting a reverse power transmission path). When both of them are released, a neutral range is established.

The continuously variable speed mechanism 210 comprises a drive pulley 211 and a driven pulley 212, each width of which is variably adjustable, and a metallic V-belt mechanism 213 disposed between the pulleys 211 and 212. Such that, when the widths of the pulleys are variably adjusted, the speed ratio is continuously varied.

Figure 12:
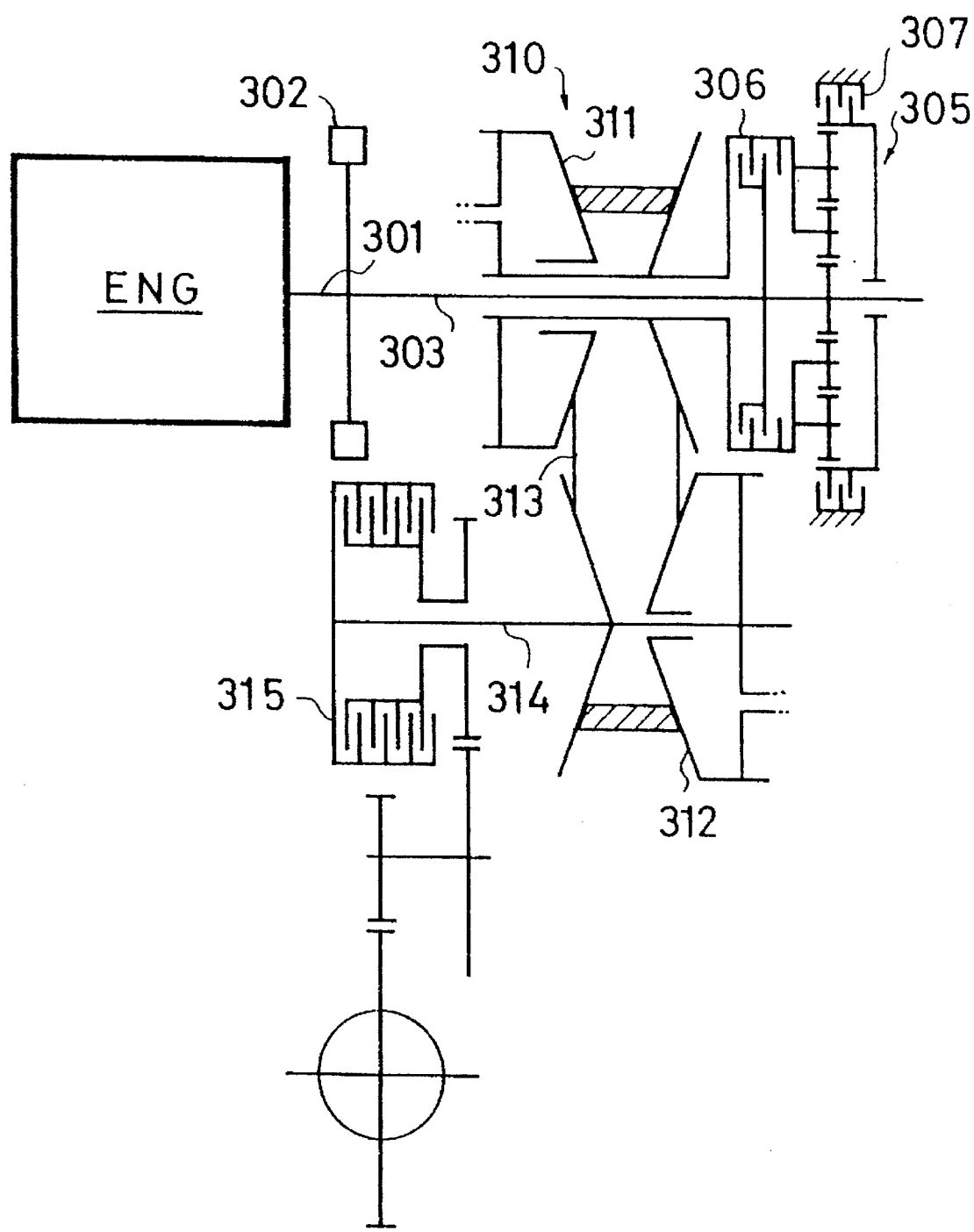
FIG. 12 is a schematic view of yet another automatic transmission, which is controlled by the shift control apparatus according to the present invention.
Figure 13:
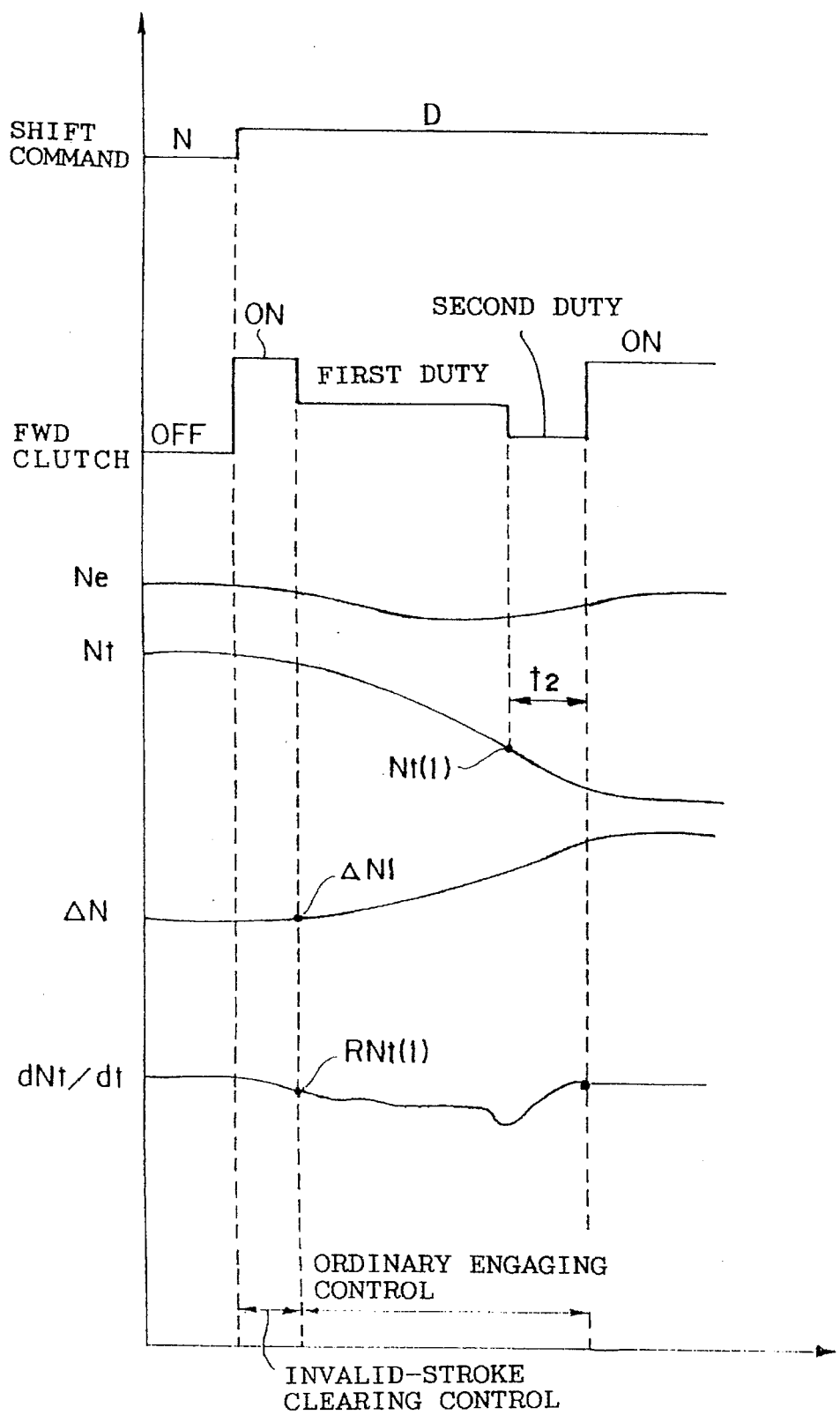
FIG. 13 is a chart showing the actuation condition of solenoid valves and chronological changes of various parameters during a shift control executed by the shift control apparatus in the above automatic transmission.

In the automatic transmission shown in FIG. 12, a transmission input shaft 303 is connected with an output shaft 301 of an engine ENG through a coupling 302 and to a forward/reverse-switching mechanism 305 similar to the one described above. This forward/reverse-switching mechanism 305 is then connected with a continuously variable speed mechanism 310, whose output shaft 314 is connected to a starting clutch 315.

In this transmission, a forward clutch 306 is engaged to establish a forward range (selecting a forward power transmission path), a reverse brake 307 is engaged to establish a reverse range (selecting a reverse power transmission path), and the starting clutch 315 is released to establish a neutral range.

In these automatic transmissions of continuously variable type, the shift from the neutral range to the driving range (forward range or reverse range) can be controlled in the same manner as in the previous embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 7-115178 filed on Apr. 17, 1995, which is incorporated herein by reference.

What is claimed is:

1. A shift control apparatus for an automatic transmission comprising:

a plurality of power transmission paths for establishing speed ranges, said power transmission paths provided between an input member and an output member;

a plurality of frictionally engaging elements for selectively establishing a predetermined power transmission path among said power transmission paths; and engagement-controlling means for controlling engagement-actuation of said frictionally engaging elements;

wherein:

said transmission is capable of establishing at least a forward range and a neutral range;

an engagement-actuation control by said engagement-controlling means for the frictionally engaging element to establish said forward range when a shift is made from said neutral range to said forward range comprises a plurality of control stages;

said shift control apparatus includes D-N-D detecting means for detecting an engagement condition of the frictionally engaging element for establishing said forward range when a shift to said forward range is made following a shift from said forward range to said neutral range; and when the shift to said forward range is made, said engagement-controlling means selects one of the control stages in correspondence with the engagement condition detected by said D-N-D detecting means and initiates said engagement-actuation control of the frictionally engaging element for establishing said forward range from the control stage so selected.

2. The shift control apparatus as set forth in claim 1 wherein:

said engagement-controlling means controls the actuation pressures of said frictionally engaging elements in response to pressure-command signals; and said control stages include an invalid-stroke clearing stage, an intermediate-pressure retaining stage and a feedback stage; said invalid-stroke clearing stage generating a pressure-command signal to set a maximum pressure to clear an invalid stroke for a first predetermined time period which starts when the shift from said neutral range to said forward range is made; said intermediate-pressure retaining stage generating a pressure-command signal to set an intermediate pressure after said first predetermined time period has elapsed until the frictionally engaging element for establishing said forward range starts engaging; and said feedback stage generating a feedback control signal using an input rotational speed as target value after the frictionally engaging element for establishing said forward range has started engaging until said frictionally engaging element completely engages.

3. The shift control apparatus as set forth in claim 2 wherein:

said input member is connected to an engine through a torque converter;

said D-N-D detecting means detects said engagement condition on a basis of an absolute value of a difference between a rate of rotational change of said engine and a rate of rotational change of a turbine of said torque converter and also on a basis of a rotational speed of said turbine; and when the shift to said forward range is made following the shift from said forward range to said neutral range:

if said absolute value is detected smaller than a predetermined value and the rotational speed of said turbine is detected smaller than a predetermined rotational speed, then said engagement-controlling means selects said feedback stage and executes said engagement-actuation control from said feedback stage;

if said absolute value is detected equal to or greater than the predetermined value, then said engagement-controlling means selects said intermediate-pressure retaining stage and executes said engagement-actuation control from said intermediate-pressure retaining stage; and if said absolute value is detected smaller than the predetermined value and the rotational speed of said turbine is detected equal to or greater than the predetermined rotational speed, then said engagement-controlling means selects one of said invalid-stroke clearing stage and said intermediate-pressure retaining stage and executes said engagement-actuation control from said invalid-stroke clearing stage or said intermediate-pressure retaining stage, respectively.

4. The shift control apparatus as set forth in claim 3 wherein:

when the shift to said forward range is made following the shift from said forward range to said neutral range, if said absolute value is detected smaller than the predetermined value and the rotational speed of said turbine is detected equal to or greater than the predetermined rotational speed:

if the shift to said forward range is made during a second predetermined time period which starts when said absolute value has become smaller than the predetermined value and the rotational speed of said turbine has become equal to or greater than the predetermined rotational speed, then said engagement-actuation control is executed from said intermediate-pressure retaining stage; and if the shift to said forward range is made after said second predetermined time period, then said engagement-actuation control is executed from said invalid-stroke clearing stage.

5. The shift control apparatus as set forth in claim 4 wherein:

said second predetermined time period is variably set in correspondence with a temperature of hydraulic oil; and said second predetermined time period is set longer with a decrease of the temperature.

6. The shift control apparatus as set forth in claim 1 wherein:

said automatic transmission is a continuously-variable-type automatic transmission which comprises a continuously variable speed mechanism capable of adjusting a speed ratio continuously variably and a forward/reverse-switching mechanism capable of alternatively establishing a forward range, a neutral range and a reverse range; and said continuously variable speed mechanism and said forward/reverse-switching mechanism constitute said power transmission paths.

7. The shift control apparatus as set forth in claim 1 wherein:

said automatic transmission is a gear-type automatic transmission which comprises a plurality of gear trains to constitute said power transmission paths.

8. The shift control apparatus as set forth in claim 7 wherein:

a first speed range is established via a second or higher speed range when a shift is made from said neutral range to said forward range;

the engagement-actuation control of the frictionally engaging element for establishing said second or higher speed range comprises a first invalid-stroke clearing stage, a first intermediate-pressure retaining stage and a releasing stage; said first invalid-stroke clearing stage generating a pressure-command signal to set a maximum pressure for a third predetermined time period to clear an invalid stroke; said first intermediate-pressure retaining stage generating a pressure-command signal to set an intermediate pressure after said third predetermined time period has elapsed until the frictionally engaging element for establishing said first speed range engages in a predetermined engagement condition; said releasing stage generating a pressure-command signal to reduce the pressure after the frictionally engaging element for establishing said first speed range has engaged in said predetermined engagement condition; and the engagement-actuation control of the frictionally engaging element for establishing said first speed range comprises a second invalid-stroke clearing stage, a second intermediate-pressure retaining stage and a feedback stage; said second invalid-stroke clearing stage generating a pressure-command signal to set a maximum pressure for a fourth predetermined time period to clear an invalid stroke; said second intermediate-pressure retaining stage generating a pressure-command signal to set an intermediate pressure after said fourth predetermined time period has elapsed until the frictionally engaging element for establishing said forward range starts engaging; said feedback stage generating a feedback control signal using an input rotational speed as target value after the frictionally engaging element for establishing said forward range has started engaging until this engagement completes; and further comprising:

first D-N-D detecting means for detecting the engagement condition of the frictionally engaging element for establishing said second or higher speed range when the shift to said forward range is made following the shift from said forward range to said neutral range;

first engagement-controlling means for selecting a control stage in correspondence with the engagement condition detected by said first D-N-D detecting means and for executing said engagement-actuation control of the frictionally engaging element for establishing said second or higher speed range from the control stage so selected;

second D-N-D detecting means for detecting the engagement condition of the frictionally engaging element for establishing said first speed range when the shift to said forward range is made following the shift from said forward range to said neutral range; and second engagement-controlling means for selecting a control stage in correspondence with the engagement condition detected by said second D-N-D detecting means and for executing said engagement-actuation control of the frictionally engaging element for establishing said fist speed range from the control stage so selected.

9. The shift control apparatus as set forth in claim 8 wherein:

said input member is connected to an engine through a torque converter;

said first and second D-N-D detecting means detect said engagement condition on a basis of an absolute value of a difference between a rate of rotational change of said engine and a rate of rotational change of a turbine of said torque converter and a rotational speed of said turbine; and when the shift to said forward range is made following the shift from said forward range to said neutral range:

if said absolute value is detected smaller than a predetermined value and the rotational speed of said turbine is detected smaller than a predetermined rotational speed, then said first engagement-controlling means selects said releasing stage and executes said engagement-actuation control from said releasing stage, and said second engagement-controlling means selects said feedback stage and executes said engagement-actuation control from said feedback stage;

if said absolute value is detected equal to or greater than the predetermined value, then said first engagement-controlling means selects said first intermediate-pressure retaining stage and executes said engagement-actuation control from said first intermediate-pressure retaining stage, and said second engagement-controlling means selects said second intermediate-pressure retaining stage and executes said engagement-actuation control from said second intermediate-pressure retaining stage; and if said absolute value is detected smaller than the predetermined value and the rotational speed of said turbine is detected equal to or greater than the predetermined rotational speed, then said first engagement-controlling means selects said first invalid-stroke clearing stage or said first intermediate-pressure retaining stage and executes said engagement-actuation control from said first invalid-stroke clearing stage or said first intermediate-pressure retaining stage, and said second engagement-controlling means selects said second invalid-stroke clearing stage and executes said engagement-actuation control from said second invalid-stroke clearing stage.

10. The shift control apparatus as set forth in claim 9 wherein:

when the shift to said forward range is made following the shift from said forward range to said neutral range, if said absolute value is detected smaller than the predetermined value and the rotational speed of said turbine is detected equal to or greater than the predetermined rotational speed; and if the shift to said forward range is made during a fifth predetermined time period which starts when said absolute value has become smaller than the predetermined value and the rotational speed of said turbine has become equal to or greater than the predetermined rotational speed, then said first engagement-controlling means selects said first intermediate-pressure retaining stage and executes said engagement-actuation control from said first intermediate-pressure retaining stage; and if the shift to said forward range is made after said fifth predetermined time period, then said first engagement-controlling means selects said first invalid-stroke clearing stage and executes said engagement-actuation control from said first invalid-stroke clearing stage.

11. The shift control apparatus as set forth in claim 10 wherein:

said fifth predetermined time period is variably set in correspondence with a temperature of hydraulic oil; and said fifth predetermined time period is set longer with decrease of the temperature.

12. The shift control apparatus as set forth in claim 8 wherein:

said input member is connected to an engine through a torque converter;

said first and second D-N-D detecting means detect said engagement condition on a basis of an absolute value of a difference between a rate of rotational change of said engine and a rate of rotational change of a turbine of said torque converter and a rotational speed of said turbine; and when the shift to said forward range is made following the shift from said forward range to said neutral range:

if said absolute value is detected smaller than a predetermined value and the rotational speed of said turbine is detected smaller than a predetermined rotational speed, then said first engagement-controlling means selects said releasing stage and executes said engagement-actuation control from said releasing stage, and said second engagement-controlling means selects said feedback stage and executes said engagement-actuation control from said feedback stage;

if said absolute value is detected equal to or greater than the predetermined value, then said first engagement-controlling means selects said first invalid-stroke clearing stage and executes said engagement-actuation control from said first invalid-stroke clearing stage, and said second engagement-controlling means selects said second intermediate-pressure retaining stage and executes said engagement-actuation control from said second intermediate-pressure retaining stage; and if said absolute value is detected smaller than the predetermined value and the rotational speed of said turbine is detected equal to or greater than the predetermined rotational speed, then said first engagement-controlling means selects said first invalid-stroke clearing stage and executes said engagement-actuation control from said first invalid-stroke clearing stage, and said second engagement-controlling means selects said second invalid-stroke clearing stage and executes said engagement-actuation control from said second invalid-stroke clearing stage.

13. The shift control apparatus as set forth in claim 12 wherein:

in a case that the shift to said forward range is made following the shift from said forward range to said neutral range and said absolute value is detected smaller than the predetermined value and the rotational speed of said turbine is detected equal to or greater than the predetermined rotational speed;

after the shift from said forward range to said neutral range is made while said first engagement-controlling means is actuating;

if the shift to said forward range is made during a sixth predetermined time period which starts when said first engagement-controlling means is interrupted of actuation, then said first engagement-controlling means selects said first intermediate-pressure retaining stage and executes said engagement-actuation control from said first intermediate-pressure retaining stage; and if the shift to said forward range is made after said sixth predetermined time period, then said first engagement-controlling means selects said first invalid-stroke clearing stage and executes said engagement-actuation control from said first invalid-stroke clearing stage.

14. The shift control apparatus as set forth in claim 13 wherein:

said sixth predetermined time period is variably set in correspondence with a temperature of hydraulic oil; and said sixth predetermined time period is set longer with decrease of the temperature.

* * * * *